United States Patent
De Mondt et al.

(10) Patent No.: US 10,308,056 B2
(45) Date of Patent: Jun. 4, 2019

(54) MANUFACTURING OF DECORATIVE SURFACES BY INKJET

(71) Applicants: AGFA NV, Mortsel (BE); Unilin BvbA, Wielsbeke (BE)

(72) Inventors: Roel De Mondt, Mortsel (BE); Nadine Willems, Mortsel (BE)

(73) Assignees: AGFA NV, Mortsel (BE); UNILIN BVBA, Wielsbeke (BE)

( * ) Notice: Subject to any disclaimer, the term of this patent is extended or adjusted under 35 U.S.C. 154(b) by 101 days.

(21) Appl. No.: 15/575,986

(22) PCT Filed: May 11, 2016

(86) PCT No.: PCT/EP2016/060507
§ 371 (c)(1),
(2) Date: Nov. 21, 2017

(87) PCT Pub. No.: WO2016/188743
PCT Pub. Date: Dec. 1, 2016

(65) Prior Publication Data
US 2018/0147873 A1 May 31, 2018

(30) Foreign Application Priority Data
May 22, 2015 (EP) .................................... 15168915

(51) Int. Cl.
*B41M 5/00* (2006.01)
*B41M 7/00* (2006.01)
(Continued)

(52) U.S. Cl.
CPC ........... *B41M 5/0047* (2013.01); *B32B 27/08* (2013.01); *B32B 27/20* (2013.01); *B32B 27/304* (2013.01);
(Continued)

(58) Field of Classification Search
USPC ....... 52/311.1, 311.2; 156/277, 308.2, 309.9, 156/311
See application file for complete search history.

(56) References Cited

U.S. PATENT DOCUMENTS 6,280,553 B1 * 8/2001 Yang ...................... B44C 1/105
156/235
8,876,274 B2 * 11/2014 Haneda ................ B41J 2/14274
347/100
(Continued)

FOREIGN PATENT DOCUMENTS

EP  2 402 154 A1  1/2012
EP  2 865 527 A1  4/2015
(Continued)

OTHER PUBLICATIONS

Official Communication issued in International Patent Application No. PCT/EP2016/060507, dated Aug. 19, 2016.

*Primary Examiner* — Brian E Glessner
*Assistant Examiner* — Adam G Barlow
(74) *Attorney, Agent, or Firm* — Keating and Bennett, LLP

(57) ABSTRACT

A method for manufacturing decorative surfaces includes the steps of a) inkjet printing an image on a first thermoplastic foil using a pigmented UV curable inkjet ink; b) applying a second thermoplastic foil on the inkjet printed image; and c) heat pressing the first and second thermoplastic foils into a decorative laminate; wherein the pigmented UV curable inkjet ink contains a polymerizable composition having 30 to 70 wt % of monofunctional polymerizable compounds and 30 to 70 wt % of polyfunctional polymerizable compounds, the weight percentage wt % is based on the total weight of the polymerizable composition; and at least one of the first and second thermoplastic foils is a transparent foil.

15 Claims, 1 Drawing Sheet

(51) Int. Cl.
  *B44C 5/04* (2006.01)
  *C09D 11/101* (2014.01)
  *B32B 27/08* (2006.01)
  *B32B 27/20* (2006.01)
  *B32B 27/30* (2006.01)
  *B32B 37/06* (2006.01)
  *B32B 37/10* (2006.01)
  *B32B 38/00* (2006.01)
  *C09D 11/322* (2014.01)
  *E04F 15/02* (2006.01)
  *E04F 15/10* (2006.01)
  *B44F 9/02* (2006.01)
  *B44F 9/04* (2006.01)

(52) U.S. Cl.
  CPC .............. *B32B 37/06* (2013.01); *B32B 37/10* (2013.01); *B32B 38/0004* (2013.01); *B32B 38/145* (2013.01); *B41M 5/0064* (2013.01); *B41M 7/0027* (2013.01); *B41M 7/0081* (2013.01); *B44C 5/04* (2013.01); *C09D 11/101* (2013.01); *C09D 11/322* (2013.01); *E04F 15/02188* (2013.01); *E04F 15/107* (2013.01); *B32B 2255/26* (2013.01); *B32B 2262/101* (2013.01); *B32B 2305/08* (2013.01); *B32B 2305/30* (2013.01); *B32B 2307/41* (2013.01); *B32B 2307/412* (2013.01); *B32B 2327/06* (2013.01); *B32B 2419/04* (2013.01); *B44F 9/02* (2013.01); *B44F 9/04* (2013.01); *E04F 15/02038* (2013.01); *E04F 15/102* (2013.01); *E04F 2201/0153* (2013.01)

(56) References Cited

U.S. PATENT DOCUMENTS

| | | | |
|---|---|---|---|
| 9,994,010 B2* | 6/2018 | Pervan | B32B 38/145 |
| 2015/0298494 A1* | 10/2015 | Ohnishi | B41M 5/0047 |
| | | | 156/249 |
| 2016/0016391 A1* | 1/2016 | Lundblad | B32B 27/08 |
| | | | 428/195.1 |
| 2017/0218520 A1* | 8/2017 | De Mondt | C09D 11/101 |
| 2017/0348978 A1* | 12/2017 | Van Garsse | B41J 2/2135 |

FOREIGN PATENT DOCUMENTS

| | | |
|---|---|---|
| EP | 2 722 373 B1 | 9/2015 |
| WO | 2011/077311 A2 | 6/2011 |
| WO | 2011/103641 A1 | 9/2011 |
| WO | 2014/084787 A1 | 6/2014 |

* cited by examiner

MANUFACTURING OF DECORATIVE SURFACES BY INKJET

CROSS REFERENCE TO RELATED APPLICATIONS

This application is a 371 National Stage Application of PCT/EP2016/060507, filed May 11, 2016. This application claims the benefit of European Application No. 15168915.5, filed May 22, 2015, which is incorporated by reference herein in its entirety.

BACKGROUND OF THE INVENTION

1. Field of the Invention

The present invention relates to the manufacturing of decorative surfaces, preferably decorative panels, using inkjet technology.

2. Description of the Related Art

Gravure, offset and flexography are being increasingly replaced for different applications by industrial inkjet printing systems, because of their flexibility in use, such as variable data printing making short production runs and personalized products possible at low cost, and their enhanced reliability, allowing incorporation into production lines.

EP 2865527 A (AGFA GRAPHICS) discloses a method of manufacturing a decorative surface including the steps of: a) impregnating a paper substrate with a thermosetting resin; b) jetting a colour pattern with one or more aqueous inkjet inks including a polymer latex binder on the thermosetting resin impregnated paper; c) drying the one or more aqueous inkjet inks; and d) heat pressing the thermosetting paper carrying the colour pattern into a decorative surface.

A major drawback of these wood- and paper-based decorative panels is their limited water resistance, which prevents their use in bathrooms and kitchens.

One approach is to use a water-resistant broadloom decorative surface, for example by applying wall-to-wall a PVC flooring roll. However, as the walls and entrances of rooms generally have multiple corners and indentations, the application of such a large flooring roll requires experienced workers and removal of all furniture from the room.

Another approach is to resolve the water resistance issue by replacing wood- and paper-based layers in decorative panels by water resistant polymeric layers. Such polymeric based floor panels employing polymers like polyvinyl chloride are disclosed by e.g. WO 2011/077311 A (FLOORING INDUSTRIES). These polymeric floor panels have interlock structures that interlock with similar panels having similar interlock structures allowing easy do-it-yourself mounting of a glue-free floor surface covering. The decorative layer in such floor panels is made by gravure printing water-based or solvent-based inks having a relatively high viscosity on a thermoplastic foil made of PVC.

Inkjet inks in general have a relatively low viscosity, which cause image quality problems, e.g. bleeding, when printing water-based or solvent-based inkjet inks on a thermoplastic foil made of PVC.

Hence, there is still a need for improved manufacturing methods of decorative surfaces using inkjet technology.

SUMMARY OF THE INVENTION

In order to overcome the problems described above, preferred embodiments of the present invention have been realised with a method for manufacturing decorative surfaces as defined below.

The use of specific pigmented UV curable inkjet inks allowed obtaining decorative panels with excellent image quality, adhesion and no cracking of the print during embossing.

The manufacturing process was made much simpler allowing it to be completely performed at the facilities of the decorative panel manufacturer.

One advantage was that the large stock of non-digitally printed decorative rolls could be eliminated as just-in-time UV inkjet printing was incorporated in the manufacturing process. Another advantage of this was that it became possible to react much faster to market trends and waste of decorative rolls was eliminated as they did not have to be ordered at a decor printer in a minimum purchasing quantity and way in advance.

In-house printing allows for a wide product variety and customized made products, e.g. decorative panels including company logo's, without substantial financial penalties.

Another advantage of inkjet printing is that the manufacturing process could be controlled to a level that, for example, an embossed wood grain is in perfect alignment with the inkjet printed wood colour pattern.

Further advantages and embodiments of the present invention will become apparent from the following description.

DETAILED DESCRIPTION OF THE PREFERRED EMBODIMENTS

Definitions

Figure 1:
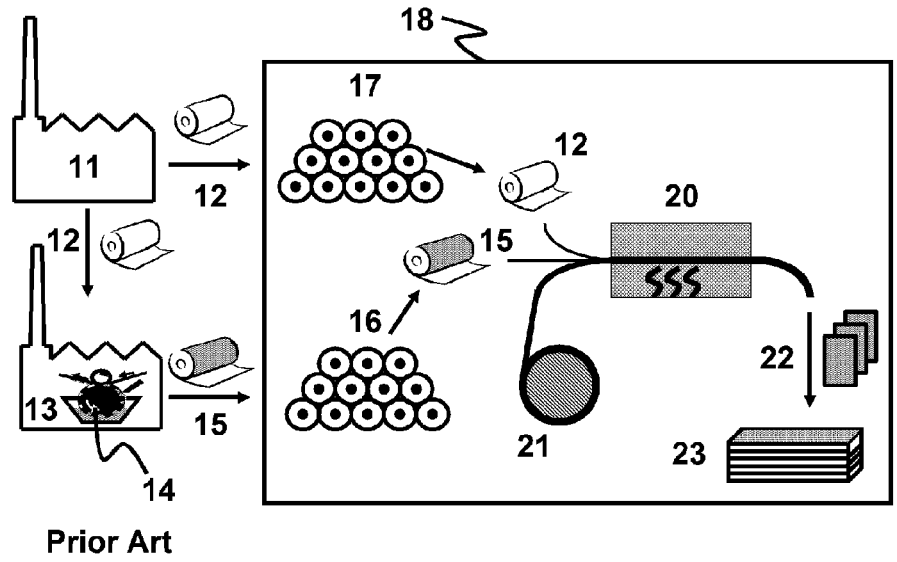
FIG. 1 shows the prior art production process for manufacturing polymeric decorative panels, wherein a PVC roll manufacturer (11) supplies a PVC roll (12) to a decor printer (13) using gravure printing (14) in order to deliver a decorative PVC roll (15) to a warehouse (16) of a floor panel manufacturer (18). The PVC roll manufacturer (11) supplies also PVC rolls (12) to a warehouse (17) of the floor panel manufacturer (18), who makes an assembly of layers from the PVC roll (12), the decorative PVC roll (15) and a base layer (21) which after heat-pressing (20) into a single unit are cut into decorative panels (22) that are collected in a decorative panel set (23) ready for sale.
Figure 2:
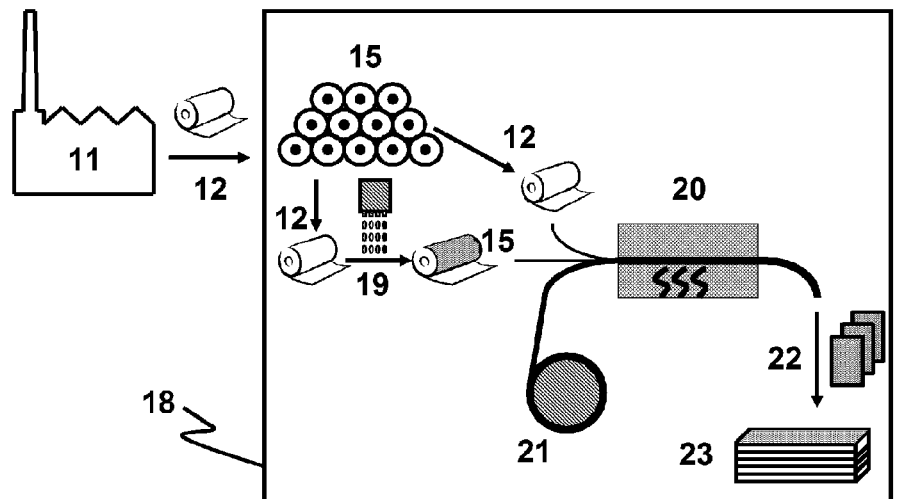
FIG. 2 shows a production process for manufacturing polymeric decorative panels, wherein a PVC roll manufacturer (11) supplies PVC rolls (12) to a warehouse (15) of a floor panel manufacturer (18), who prepares a decorative PVC roll (15) by inkjet printing (19) on a PVC roll (12). The floor panel manufacturer (18) then makes an assembly of layers from the PVC roll (12), the decorative PVC roll (15) and a base layer (21) which after heat-pressing (20) into a single unit are cut into decorative panels (22) that are collected in a decorative panel set (23) ready for sale.

The term "monofunctional polymerizable compound" means that the polymerizable compound includes one polymerizable group.

The term "difunctional polymerizable compound" means that the polymerizable compound includes two polymerizable groups.

The term "polyfunctional polymerizable compound" means that the polymerizable compound includes more than two polymerizable groups.

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_1$ to $C_6$-alkenyl group.

Unless otherwise specified a substituted or unsubstituted alkynyl group is preferably a $C_1$ to $C_6$-alkynyl group.

Unless otherwise specified a substituted or unsubstituted aralkyl group is preferably a phenyl or naphthyl group including one, two, three or more $C_1$ to $C_6$-alkyl groups.

Unless otherwise specified a substituted or unsubstituted alkaryl group is preferably a $C_7$ to $C_{20}$-alkyl group including a phenyl group or naphthyl group.

Unless otherwise specified a substituted or unsubstituted aryl group is preferably a phenyl group or naphthyl group Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more constituents selected from the group consisting of methyl, ethyl, n-propyl, isopropyl, n-butyl, isobutyl and tertiary-butyl, ester, amide, ether, thio-ether, ketone, aldehyde, sulfoxide, sulfone, sulfonate ester, sulphonamide, —Cl, —Br, —I, —OH, —SH, —CN and —NO$_2$.

Manufacturing Methods of Decorative Surfaces

A method for manufacturing decorative surfaces, preferably decorative panels, according to a preferred embodiment of the present invention includes the steps of: a) inkjet printing (19) an image on a first thermoplastic foil (12) using a pigmented UV curable inkjet ink; b) applying a second thermoplastic foil (12) on the inkjet printed image; and c) heat pressing (20) the first and second thermoplastic foils into a decorative laminate; wherein the pigmented UV curable inkjet ink contains a polymerizable composition having 30 to 70 wt %, preferably 35 to 65 wt % of monofunctional polymerizable compounds and 30 to 70 wt %, preferably 35 to 65 wt % of polyfunctional polymerizable compounds, wherein the weight percentage wt % is based on the total weight of the polymerizable composition; and wherein at least one of the first and second thermoplastic foils is a transparent foil.

In a more preferred embodiment, the above method includes a step d) of cutting the laminate into a decorative panel (22). The method of the invention can also be used to manufacture broadloom decorative surfaces (e.g. vinyl rolls), but is preferably used for manufacturing decorative panels, as the latter do not require experienced workers for their application and removal of all furniture from a room.

The foils are thermoplastic so that they can be fused together during heat-pressing (20). Heat pressing is preferably performed by preheating the first and second thermoplastic foils preferably to a temperature above 130° C., more preferably between 140 and 170° C., and then using a cooled press to fuse them into a decorative laminate. Alternatively, the press containing the first and second thermoplastic foils may be heated to a temperature above 130° C., followed by cooling the press to fuse the first and second thermoplastic foils into a decorative laminate. The pressure used in both methods is preferably more than 10 bar, more preferably between 15 and 40 bar.

The thermoplastic foils are preferably selected from the groups consisting of polyvinyl chloride (PVC), polyolefins like polyethylene (PE) and polypropylene (PP), polyamides (PA), polyurethane (PU), polystyrene (PS), acrylonitrile-butadiene-styrene (ABS), polymethyl methacrylate (PMMA), polycarbonate (PC), polyethylene terephthalate (PET), polyetheretherketone (PEEK) or mixtures or co-polymers of these.

In a preferred embodiment, the first and second thermoplastic foils are polyvinyl chloride foils. The polyvinylchloride foils are preferably of the rigid type including less than 10 wt % of plasticizer, more preferably these PVC foils contain 0 to 5 wt % of plasticizer. The plasticizer may be a phthalate plasticizer, but is preferably a non-phthalate plasticizer for health reasons.

Preferred non-phthalate plasticizers include diisononyl cyclohexane-1,2-dicarboxylate (DINCH), dipropylene glycol dibenzoate (DGD), diethylene glycol dibenzoate (DEGD), triethylene glycol dibenzoate (TEGD), acetylated monoglycerides of fully hydrogenated castor oil (COMGHA) isosorbide esters, bis-(2-ethylhexyl) terephthalate, vegetable oil based plasticizers like Ecolibrium™ from DOW, and blends thereof. In a preferred embodiment, the pigmented UV curable inkjet ink is cured using UV LEDs.

Decorative Surfaces

Here below the invention will be disclosed for decorative panels, but with the exception of the tongue and groove profiles, the invention is equally applicable to a broadloom decorative surface, such as a vinyl roll.

A decorative panel (22) obtained by the method according to the present invention includes an inkjet printed image between two thermoplastic foils, wherein at least one of the two thermoplastic foils is a transparent foil.

In one embodiment, the decorative panel (22) includes an inkjet printed image on a first thermoplastic foil which forms the decorative layer (34) and a second transparent foil as the protective layer (33), and preferably also a base layer (35) for enhancing the rigidity of the panel. The first thermoplastic foil is preferably an opaque, more preferably a white opaque thermoplastic foil.

In an alternative embodiment, the image is inkjet printed on the transparent thermoplastic foil used as protective layer (33), the other thermoplastic foil, preferably opaque, is then fused to the side of the protective layer carrying the inkjet printed image, more preferably together with a base layer (35) for enhancing the rigidity of the panel. In the latter the transparent thermoplastic foil fulfils the role of both the decorative layer as well as the protective layer, and may be called a decorative protective layer.

The advantage of having an opaque thermoplastic foil in contact with the protective layer is that the colour vividness of the inkjet printed image is enhanced and that any irregularities influencing image quality in a base layer are masked. The opaque thermoplastic foil is preferably a white opaque thermoplastic foil, but may also be a yellowish or brownish opaque thermoplastic foil for reducing ink consumption during inkjet printing.

In a preferred embodiment a primer is applied on the second thermoplastic foil for further enhancement of the adhesion between the thermoplastic foils. The primer is preferably selected from a polyurethane hot melt primer, a polyamide hot melt primer, a vinylchloride vinylacetate primer (VC-VAC) or a two component system of aliphatic isocyanates and a hydroxyl-, carboxy- or amine functionalized polyester or polyether.

In a more preferred embodiment, the decorative panel (22) includes a tongue (31) and groove (32) for glue-less interlocking with decorative panels having a similar tongue and groove. In a more preferred embodiment, the tongue (31) and groove (32) are part of the base layer (35).

Figure 3:
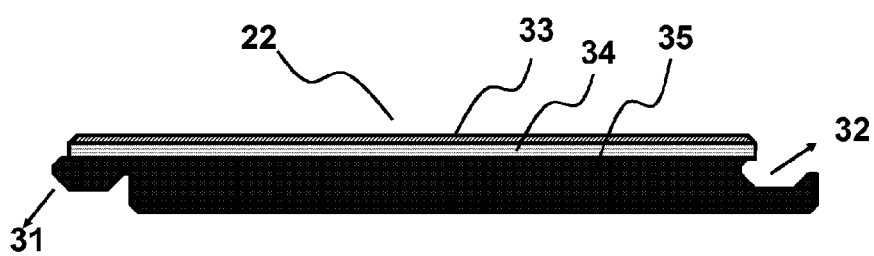
FIG. 3 shows a cross-section of a decorative panel (22) including a base layer (35) with a tongue (31) and groove (32) laminated on the top side by a decorative layer (34) and a protective layer (33).

Decorative panels including a tongue and a groove of a special shape (see FIG. 3) can be clicked into one another. The advantage thereof is a fast and easy assembly of a floor or wall requiring no glue. The shape of the tongue and groove necessary for obtaining a good mechanical join is well-known in the art of laminate flooring, as exemplified in EP 2280130 A (FLOORING IND), WO 2004/053258 (FLOORING IND), US 2008010937 (VALINGE) and U.S. Pat. No. 6,418,683 (PERSTORP FLOORING).

The tongue and groove profiles are especially preferred for flooring panels and wall panels, but in the case of furniture panels, such tongue and groove profile is preferably absent for aesthetical reasons of the furniture doors and drawer fronts. However, a tongue and groove profile may be used to click together the other panels of the furniture, as illustrated by US 2013071172 (UNILIN).

A decorative panel, like a floor panel, has one decorative layer. However, a decorative layer may be applied on both sides of a base layer. The latter is especially desirable in the case of decorative panels for furniture. In such a case, preferably also a protective layer is applied on both decorative layers present on both sides of the base layer.

The decorative panels may have any desired shape such as a square, a rectangle or an octagon. For flooring, the decorative panels preferably have a rectangular shape, for example, 18 cm×140 cm, and a thickness of 2 to 6 mm. At a thickness of no more than 6 mm, a large floor surface can be covered with a rather limited weight of decorative panels. The low weight increases comfort when installing the decorative panels and causes a financial benefit in transport to warehouses compared to heavier wood based decorative panels.

In a preferred embodiment, the decorative panels are made in the form of rectangular oblong strips. The dimensions thereof may vary greatly. Preferably the panels have a length exceeding 1 meter, and a width exceeding 0.1 meter, e.g. the panels can be about 1.3 meter long and about 0.15 meter wide. According to a special embodiment the length of the panels exceeds 2 meter, with the width being preferably about 0.2 meter or more. The print of such panels is preferably free from repetitions.

In a preferred embodiment the decorative panels are selected from the group consisting of kitchen panels, flooring panels, furniture panels, ceiling panels and wall panels.

The decorative panels may further include a sound-absorbing layer as disclosed by U.S. Pat. No. 8,196,366 (UNILIN).

Decorative Layers

The decorative layer includes a thermoplastic foil and an image, usually a colour pattern, printed thereon by inkjet.

There is no real restriction on the content of the colour pattern. The colour pattern may also contain information such as text, arrows, logo's and the like. The advantage of inkjet printing is that such information can be printed at low volume without extra cost, contrary to gravure printing.

In a preferred embodiment, the colour pattern is a wood reproduction or a stone reproduction, but it may also be a fantasy or creative pattern, such as an ancient world map or a geometrical pattern, or even a single colour for making, for example, a floor consisting of black and red tiles or a single colour furniture door.

An advantage of printing a wood colour pattern is that a floor can be manufactured imitating besides oak, pine and beech, also very expensive wood like black walnut which would normally not be available for house decoration.

An advantage of printing a stone colour pattern is that a floor can be manufactured which is an exact imitation of a stone floor, but without the cold feeling when walking barefooted on it and that it is easy replaceable over time according to fashion.

The thermoplastic foil used as decorative layer preferably has a thickness of at least 80 µm.

Protective Layers

The top surface of the decorative panel is usually the thermoplastic foil forming the protective layer. However, additional finishing layers may be applied upon the protective layer.

In a preferred embodiment, an antistatic layer is applied on the protective layer. Techniques to render decorative panels antistatic are well-known in the art of decorative laminates as exemplified by EP 1567334 A (FLOORING IND).

In a particular preferred embodiment, the decorative panel has a polyurethane finishing layer on the protective layer (33).

The top surface of the decorative panel, i.e. at least the protective layer, is preferably provided with a relief matching the colour pattern, such as for example the wood grain, cracks and knots in a woodprint. Embossing techniques to accomplish such relief are well-known in the art of flooring panels as disclosed by, for example, EP 1290290 A (FLOORING IND), US 2006144004 (UNILIN), EP 1711353 A (FLOORING IND) and US 2010192793 (FLOORING IND).

Most preferably the relief is formed by pressing a digital embossing plate against the thermoplastic foil forming the protective layer during heat-pressing.

A digital embossing plate is a plate which comprises elevations that can be used to form a relief on decorative panel by pressing the digital embossing plate against the protective layer of the decorative panel or nested decorative panels. The elevations are cured inkjet droplets, jetted by an inkjet print device, and most preferably UV cured inkjet droplets. The elevations are preferably formed by printing and curing inkjet droplets on top of already cured or pin-cured inkjet droplets. The plate is preferably stiff by using metal or hard plastic.

An alternative of a digital embossing plate may be a digital embossing cylinder which is a cylinder that comprises the elevations to form a relief on decorative panels by pressing and rotating the digital embossing cylinder against the protective layer of the decorative panels.

A finishing layer, preferably a polyurethane finishing layer, may include hard particles, like corundum, for preventing scratching of the top surface. The total quantity of hard particles is preferably between 1 g/m² and 100 g/m², preferably 2 g/m² to 50 g/m².

Preferred hard particles are ceramic or mineral particles chosen from the group of aluminium oxide, silicon carbide, silicon oxide, silicon nitride, tungsten carbide, boron carbide, and titanium dioxide, or from any other metal oxide, metal carbide, metal nitride or metal carbonitride. The most preferred hard particles are corundum and so-called Sialon ceramics. In principle, a variety of particles may be used. Of course, also any mixture of the above-mentioned hard particles may be applied.

The amount of hard particles may determined in function of the desired scratch resistance.

Hard particles having an average particle size of between 1 and 200 μm are preferred. Preferably an amount of such particles of between 1 and 40 g/m² is applied above the printed pattern. An amount lower than 20 g/m² can suffice for the lower qualities.

The thermoplastic foil used as protective layer preferably has a thickness of more than 100 μm, more preferably 300 to 700 μm.

Base Layers

In a preferred embodiment, the decorative panel (22) includes a base layer (35). The base layer provides sufficient rigidness to the decorative panel, so that when e.g. a long rectangular decorative panel bends under its own weight, the panel does not break. For this reason, the base layer is preferably reinforced with fibres.

In a preferred embodiment, the base layer (35) includes substantially polyvinyl chloride and reinforcing fibres. More preferably, the base layer includes substantially polyvinyl chloride and glass fibres.

The base layer may be composed of two foils interposed by a glass fibre fleece.

The base layer may contain mineral. Particularly suitable herein are as talc or calcium carbonate (chalk), aluminum oxide, silica. The base layer may include a flame retardant.

The base layer may also be a so-called woodplastic composite (WPC), preferably containing one or more polymers or copolymers selected from the group consisting polypropylene, polyethylene and polyvinyl chloride.

Pigmented UV Curable Inkjet Inks

The colour pattern is printed using one or more pigmented UV curable inkjet inks containing a polymerizable composition having 30 to 70 wt %, preferably 35 to 65 wt % and more preferably 40 to 65 wt % of monofunctional polymerizable compounds and 30 to 70 wt %, preferably 35 to 65 wt % preferably 35 to 60 wt % of polyfunctional polymerizable compounds, wherein the weight percentage wt % is based on the total weight of the polymerizable composition.

In a preferred embodiment, the monofunctional and polyfunctional polymerizable compounds consist for more than 80 wt %, preferably more than 90 wt % of acrylates, wherein the weight percentage wt % is based on the total weight of the polymerizable composition. Such inkjet inks exhibit a high curing speed and are especially useful for UV LED curing.

In the most preferred embodiment, the inkjet inks do not contain intentionally added water or organic solvents, but may contain a very small amount of water, generally less than 5 wt % of water based on the total weight of the ink. This water was not intentionally added but came into the formulation via other components as a contamination, such as for example polar organic solvents. Higher amounts of water than 5 wt % of water based on the total weight of the ink often makes the inkjet inks instable, preferably the water content is less than 1 wt % based on the total weight of the ink and most preferably no water at all is present.

In a less preferred embodiment, the pigmented UV curable inkjet ink contains 20 to 60 wt % of organic solvent based on the total weight of the inkjet ink. In such a case, besides the UV curing means extra drying means for solvent evaporation becomes necessary.

The inkjet inks are composed into an inkjet ink set having differently coloured inkjet inks. The inkjet ink set may be a standard CMYK ink set, but is preferably a CRYK ink set wherein the magenta (M) ink is replaced by red (R) inkjet ink. The use of a red inkjet ink enhances the colour gamut for wood based colour patterns, which represent the majority of decorative panels in flooring.

The inkjet ink set may be extended with extra inks such as brown, red, green, blue, and/or orange to further enlarge the colour gamut of the ink set. The inkjet ink set may also be extended by the combination of the full density inkjet inks with light density inkjet inks. The combination of dark and light colour inks and/or black and grey inks improves the image quality by a lowered graininess. However preferably the inkjet ink set consists of no more than 3 or 4 inkjet inks, allowing the design of single pass inkjet printers of high throughput at acceptable cost.

In addition to the polymerizable compounds, the pigmented UV curable inkjet inks include one or more photoinitiators, one or more co-initiators, one or more inhibitors and one or more surfactants in amounts that are desired to be jetabble and curable by inkjet printers.

In a preferred embodiment, the monofunctional polymerizable compounds consist of monoacrylates. Using monoacrylates instead of e.g. methacrylates and vinyllactams allows for high curing speeds.

The pigmented UV curable inkjet ink is preferably a free radical curable inkjet ink. It was found in industrial inkjet printing systems that cationically curable inkjet inks posed problems of jetting reliability due to UV stray light. The UV-curing of the ink caused reflections of UV light, including UV light hitting the nozzle plate of an inkjet print head and resulting into failing nozzles due to clogging by cured ink in the nozzle. Unlike free radical ink where radical species have a much shorter lifetime, the cationic curable ink continues to cure once an acid species has been generated by UV light in the nozzle.

Polymerizable Compounds

The polymerizable compounds are preferably present in the pigmented UV curable inkjet inks in an amount of at least 60 wt %, more preferably at least 70 wt %, wherein the wt % is based on the total weight of the inkjet ink.

Any monomer and oligomer capable of free radical polymerization may be used as polymerizable compound. The viscosity of the UV curable inkjet ink can be adjusted by varying the ratio between the monomers and oligomers. The polymerizable compounds may be any monomer and/or oligomer found in the Polymer Handbook Vol 1+2, 4th edition, edited by J. BRANDRUP et al., Wiley-Interscience, 1999.

In a preferred embodiment, the monofunctional polymerizable compounds are selected from acrylic acid, methacrylic acid, maleic acid (or there salts), maleic anhydride, alkyl(meth)acrylates (linear, branched and cycloalkyl) such as methyl(meth)acrylate, n-butyl(meth)acrylate, tert-butyl (meth)acrylate, cyclohexyl(meth)acrylate, and 2-ethylhexyl (meth)acrylate; aryl(meth)acrylates such as benzyl(meth) acrylate, and phenyl(meth)acrylate; hydroxyalkyl(meth) acrylates such as hydroxyethyl(meth)acrylate, and hydroxypropyl(meth)acrylate; (meth)acrylates with other types of functionalities (e.g. oxiranes, amino, fluoro, polyethylene oxide, phosphate substituted) such as glycidyl (meth)acrylate, dimethylaminoethyl(meth)acrylate, trifluoroethyl acrylate, methoxypolyethyleneglycol (meth)acrylate, and tripropyleneglycol (meth)acrylate phosphate; allyl derivatives such as allyl glycidyl ether; styrenics such as styrene, 4-methylstyrene, 4-hydroxystyrene, 4-acetostyrene, and styrenesulfonic acid; (meth)acrylonitrile; (meth)acrylamides (including N-mono and N,N-disubstituted) such as N-benzyl (meth)acrylamide; maleimides such as N-phenyl maleimide; vinyl derivatives such as vinylcaprolactam, vinylpyrrolidone, vinylimidazole, vinylnapthalene, and vinyl halides; vinylethers such as vinylmethyl ether; vinylesters of carboxylic acids such as vinylacetate, vinylbutyrate, and vinyl benzoate.

In a more preferred embodiment, the monofunctional polymerizable compounds are selected from monoacrylates and vinyllactams, such as N-vinylcaprolactam Particularly preferred monofunctional polymerizable compounds are selected from the group consisting of isoamyl acrylate, stearyl acrylate, lauryl acrylate, octyl acrylate, decyl acrylate, isoamylstyl acrylate, isostearyl acrylate, 2-ethylhexyl-diglycol acrylate, 2-hydroxybutyl acrylate, 2-acryloyloxyethylhexahydrophthalic acid, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, vinyl ether acrylate, 2-acryloyloxyethylsuccinic acid, 2-acryloyxyethylphthalic acid, 2-acryloxyethyl-2-hydroxyethyl-phthalic acid, lactone modified flexible acrylate, t-butylcyclohexyl acrylate, caprolactone acrylate, cyclic trimethylolpropane formal acrylate, cyclic trimethylolpropane formal acrylate, ethoxylated nonyl phenol acrylate, isodecyl acrylate, isooctyl acrylate, octyldecyl acrylate, alkoxylated phenol acrylate, tridecyl acrylate and acryloylmorpholine.

Particularly preferred polyfunctional polymerizable compounds are selected from the group consisting of triethylene glycol diacrylate, tetraethylene glycol diacrylate, polyethylene glycol diacrylate, dipropylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethyloltricyclodecane diacrylate, bisphenol A EO (ethylene oxide) adduct diacrylate, bisphenol A PO (propylene oxide) adduct diacrylate, hydroxypivalate neopentyl glycol diacrylate, propoxylated neopentyl glycol diacrylate, alkoxylated dimethyloltricyclodecane diacrylate and polytetramethylene glycol diacrylate, trimethylolpropane triacrylate, EO modified trimethylolpropane triacrylate, tri (propylene glycol) triacrylate, caprolactone modified trimethylolpropane triacrylate, pentaerythritol triacrylate, pentaerithritol tetraacrylate, pentaerythritolethoxy tetraacrylate, dipentaerythritol hexaacrylate, ditrimethylolpropane tetraacrylate, glycerinpropoxy triacrylate, alkoxylated cyclohexanone dimethanol diacrylate, caprolactam modified dipentaerythritol hexaacrylate, alkoxylated cyclohexanone dimethanol diacrylate, alkoxylated hexanediol diacrylate, dioxane glycol diacrylate, dioxane glycol diacrylate, cyclohexanone dimethanol diacrylate, diethylene glycol diacrylate, neopentyl glycol diacrylate, vinylether acrylates, propoxylated glycerine triacrylate and propoxylated trimethylolpropane triacrylate, di-trimethylolpropane tetraacrylate, dipentaerythritol pentaacrylate, ethoxylated pentaeryhtitol tetraacrylate, methoxylated glycol acrylates and acrylate esters.

Preferred vinylether acrylates are those disclosed in U.S. Pat. No. 6,310,115 (AGFA). A particularly preferred compound is 2-(2-vinyloxyethoxy)ethyl acrylate. Other suitable vinylether acrylates are those disclosed in columns 3 and 4 of U.S. 67/679,890 B (NIPPON SHOKUBAI).

Colorants

The colour pigments may be black, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley-VCH, 2004. ISBN 3527305769.

A particularly preferred pigment for a cyan aqueous inkjet ink is a copper phthalocyanine pigment, more preferably C.I. Pigment Blue 15:3 or C.I. Pigment Blue 15:4.

Particularly preferred pigments for a red aqueous inkjet ink are C.I Pigment Red 254, C.I. Pigment Red 176 and C.I. Pigment Red 122, and mixed crystals thereof.

Particularly preferred pigments for yellow aqueous inkjet ink are C.I Pigment Yellow 151, C.I. Pigment Yellow 180 and C.I. Pigment Yellow 74, and mixed crystals thereof.

For the black ink, suitable pigment materials include carbon blacks such as Regal™ 400R, Mogul™ L, Elftex™ 320 from Cabot Co., or Carbon Black FW18, Special Black™ 250, Special Black™ 350, Special Black™ 550, Printex™ 25, Printex™ 35, Printex™ 55, Printex™ 90, Printex™ 150T from DEGUSSA Co., MA8 from MITSUBISHI CHEMICAL Co., and C.I. Pigment Black 7 and C.I. Pigment Black 11.

Also mixed crystals may be used. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is Cinquasia™ Magenta RT-355-D from Ciba Specialty Chemicals.

Also mixtures of pigments may be used. For example, a black inkjet ink may include a carbon black pigment and at least one pigment selected from the group consisting of a blue pigment, a cyan pigment, a magenta pigment and a red pigment. It was found that such a black inkjet ink allowed easier and better colour management for wood colours.

In a particularly preferred embodiment, the jetted pigmented inks include at least three aqueous pigmented inkjet inks and/or organic solvent based pigmented inkjet inks include a pigment selected from the group consisting of carbon black, C.I. Pigment Blue 15:3, C.I. Pigment Blue 15:4, C.I Pigment Yellow 151, C.I. Pigment Yellow 180, C.I. Pigment Yellow 74, C.I Pigment Red 254, C.I. Pigment Red 176, C.I. Pigment Red 122, and mixed crystals thereof. It was found that in such a case, very light stable colour patterns could be obtained.

The pigment particles in the pigmented inkjet ink should be sufficiently small to permit free flow of the ink through the inkjet printing device, especially at the ejecting nozzles. It is also desirable to use small particles for maximum colour strength and to slow down sedimentation.

The average particle size of the pigment in the pigmented inkjet ink should be between 0.005 μm and 15 μm. Preferably the average pigment particle size is between 0.005 and 5 μm, more preferably between 0.005 and 1 μm, particularly preferably between 0.005 and 0.3 μm and most preferably between 0.040 and 0.150 μm.

The pigment is used in the inkjet ink in an amount of 0.1 to 20 wt %, preferably 1 to 10 wt %, and most preferably 2 to 6 wt % based on the total weight of the pigmented inkjet ink. A pigment concentration of at least 2 wt % is preferred to reduce the amount of inkjet ink needed to produce the colour pattern, while a pigment concentration higher than 5 wt % reduces the colour gamut for printing the colour pattern with print heads having a nozzle diameter of 20 to 50 μm.

A white inkjet ink preferably includes a pigment with a high refractive index, preferably a refractive index greater than 1.60, preferably greater than 2.00, more preferably greater than 2.50 and most preferably greater than 2.60. Such white pigments generally have a very covering power, i.e. a limited amount of white ink is necessary to hide the colour and defects of the core layer. The most preferred white pigment is titanium dioxide.

The white inkjet ink preferably contains the white pigment in an amount of 5 wt % to 30 wt %, more preferably 8 to 25 wt % of white pigment based upon the total weight of the white inkjet ink.

The numeric average particle diameter of the white pigment is preferably from 50 to 500 nm, more preferably from 150 to 400 nm, and most preferably from 200 to 350 nm. Sufficient hiding power cannot be obtained when the average diameter is less than 50 nm, and the storage ability and the jet-out suitability of the ink tend to be degraded when the average diameter exceeds 500 nm.

Polymeric Dispersants

Typical polymeric dispersants are copolymers of two monomers but may contain three, four, five or even more monomers. The properties of polymeric dispersants depend on both the nature of the monomers and their distribution in the polymer. Copolymeric dispersants preferably have the following polymer compositions:
- statistically polymerized monomers (e.g. monomers A and B polymerized into ABBAABAB);
- alternating polymerized monomers (e.g. monomers A and B polymerized into ABABABAB);
- gradient (tapered) polymerized monomers (e.g. monomers A and B polymerized into AAABAABBABBB);
- block copolymers (e.g. monomers A and B polymerized into AAAAABBBBBB) wherein the block length of each of the blocks (2, 3, 4, 5 or even more) is important for the dispersion capability of the polymeric dispersant;
- graft copolymers (graft copolymers consist of a polymeric backbone with polymeric side chains attached to the backbone); and
- mixed forms of these polymers, e.g. blocky gradient copolymers.

Suitable polymeric dispersants are listed in the section on "Dispersants", more specifically [0064] to [0070] and [0074] to [0077], in EP 1911814 A (AGFA GRAPHICS) incorporated herein as a specific reference.

The polymeric dispersant has preferably a number average molecular weight $M_n$ between 500 and 30000, more preferably between 1500 and 10000.

The polymeric dispersant has preferably a weight average molecular weight $M_w$ smaller than 100,000, more preferably smaller than 50,000 and most preferably smaller than 30,000.

The polymeric dispersant has preferably a polydispersity PD smaller than 2, more preferably smaller than 1.75 and most preferably smaller than 1.5.

Commercial examples of polymeric dispersants are the following:
- DISPERBYK™ dispersants available from BYK CHEMIE GMBH;
- SOLSPERSE™ dispersants available from NOVEON;
- TEGO™ DISPERS™ dispersants from EVONIK;
- EDAPLAN™ dispersants from MUNZING CHEMIE;
- ETHACRYL™ dispersants from LYONDELL;
- GANEX™ dispersants from ISP;
- DISPEX™ and EFKA™ dispersants from CIBA SPECIALTY CHEMICALS INC;
- DISPONER™ dispersants from DEUCHEM; and
- JONCRYL™ dispersants from JOHNSON POLYMER.

Particularly preferred polymeric dispersants include Solsperse™ dispersants from NOVEON, Efka™ dispersants from CIBA SPECIALTY CHEMICALS INC and Disperbyk™ dispersants from BYK CHEMIE GMBH. Particularly preferred dispersants are Solsperse™ 32000, 35000 and 39000 dispersants from NOVEON.

The polymeric dispersant is preferably used in an amount of 2 to 600 wt %, more preferably 5 to 200 wt %, most preferably 50 to 90 wt % based on the weight of the pigment.

Photoinitiating System

The photoinitiating system includes one or more photoinitiators and optionally one or more co-initiators The photoinitiator is preferably a free radical initiator. A free radical photoinitiator is a chemical compound that initiates polymerization of monomers and oligomers when exposed to actinic radiation by the formation of a free radical.

Two types of free radical photoinitiators can be distinguished and used in the inkjet ink of the present invention. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or co-initiator. Both type I and type II photoinitiators can be used in the present invention, alone or in combination.

In order to increase the photosensitivity further, the UV curable inkjet ink may additionally contain co-initiators. Suitable examples of co-initiators can be categorized in three groups:
1. tertiary aliphatic amines such as methyldiethanolamine, dimethylethanolamine, triethanolamine, triethylamine and N-methylmorpholine;
2. aromatic amines such as amylparadimethylaminobenzoate, 2-n-butoxyethyl-4-(dimethylamino) benzoate, 2-(dimethylamino)ethylbenzoate, ethyl-4-(dimethylamino)benzoate, and 2-ethylhexyl-4-(dimethylamino) benzoate; and
3. (meth)acrylated amines such as dialkylamino alkyl (meth)acrylates (e.g., diethylaminoethylacrylate) or N-morpholinoalkyl-(meth)acrylates (e.g., N-morpholinoethyl-acrylate).

The preferred co-initiators are aminobenzoates.

Suitable photo-initiators are disclosed in CRIVELLO, J. V., et al. VOLUME III: Photoinitiators for Free Radical Cationic. 2nd edition. Edited by BRADLEY, G. London, UK: John Wiley and Sons Ltd, 1998. p. 287-294.

Specific examples of photo-initiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis (2,6-dimethylbenzoyl)-2,4, 4-trimethylpentylphosphine oxide, 2,4, 6trimethylbenzoyldiphenylphosphine oxide, 2-methyl-1-[4-(methylthio) phenyl]-2-morpholinopropan-1-one, 2,2-dimethoxy-1, 2-diphenylethan-1-one or 5,7-diiodo-3-butoxy-6-fluorone.

Suitable commercial photo-initiators include Irgacure™ 184, Irgacure™ 500, Irgacure™ 907, Irgacure™ 369, Irgacure™ 1700, Irgacure™ 651, Irgacure™ 819, Irgacure™ 1000, Irgacure™ 1300, Irgacure™ 1870, Darocur™ 1173, Darocur™ 2959, Darocur™ 4265 and Darocur™ ITX available from CIBA SPECIALTY CHEMICALS, Lucerin™ TPO available from BASF AG, Esacure™ KT046, Esacure™ KIP150, Esacure™ KT37 and Esacure™ EDB available from LAMBERTI, H-Nu™ 470 and H-Nu™ 470X available from SPECTRA GROUP Ltd.

In a preferred embodiment, the photoinitiator is selected from the group consisting of non-polymeric multifunctional photoinitiators, oligomeric or polymeric photoinitiators and polymerizable photoinitiators. Such a diffusion hindered photoinitiator exhibits a much lower mobility in a cured layer of the UV curable inkjet inks than a low molecular weight monofunctional photoinitiator, such as benzophenone. Including diffusion hinderd photoinitiators, and also diffusion hindered co-initiators have a safety advantage for the operator of the inkjet printer.

Most preferably the diffusion hindered photoinitiator is a polymerizable photoinitiator, preferably having at least one acrylate group. And most preferably the diffusion hindered coinitiator is a polymerizable coinitiator, preferably having at least one acrylate group.

Suitable diffusion hindered photoinitiator may contain one or more photoinitiating functional groups derived from a Norrish type I-photoinitiator selected from the group consisting of benzoinethers, benzil ketals, α,α-dialkoxyacetophenones, α-hydroxyalkylphenones, α-aminoalkylphenones, acylphosphine oxides, acylphosphine sulfides, α-haloketones, α-halosulfones and phenylglyoxalates.

A suitable diffusion hindered photoinitiator may contain one or more photoinitiating functional groups derived from a Norrish type II-initiator selected from the group consisting of benzophenones, thioxanthones, 1,2-diketones and anthraquinones.

Suitable diffusion hindered photoinitiators are also those disclosed in EP 2053101 A (AGFA GRAPHICS) in paragraphs [0074] and [0075] for difunctional and multifunctional photoinitiators, in paragraphs [0077] to [0080] for polymeric photoinitiators and in paragraphs [0081] to [0083] for polymerizable photoinitiators.

Other preferred polymerizable photoinitiators are those disclosed in EP 2065362 A (AGFA) and EP 2161264 A (AGFA), incorporated herein by reference.

A preferred amount of photoinitiator is 0-50 wt %, more preferably 0.1-20 wt %, and most preferably 0.3-15 wt % of the total weight of the curable pigment dispersion or ink.

Preferred diffusion hindered co-initiators are the polymerizable co-initiators disclosed in EP 2053101 A (AGFA GRAPHICS) in paragraphs [0088] and [0097].

Preferred diffusion hindered co-initiators include a polymeric co-initiator having a dendritic polymeric architecture, more preferably a hyperbranched polymeric architecture. Preferred hyperbranched polymeric co-initiators are those disclosed in US 2006014848 (AGFA) incorporated herein as a specific reference.

The UV curable ink preferably comprises the diffusion hindered co-initiator in an amount of 0.1 to 50 wt %, more preferably in an amount of 0.5 to 25 wt %, most preferably in an amount of 1 to 10 wt % of the total weight of the ink.

Polymerization Inhibitors

The UV curable inkjet ink may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used.

Suitable commercial inhibitors are, for example, Sumilizer™ GA-80, Sumilizer™ GM and Sumilizer™ GS produced by Sumitomo Chemical Co. Ltd.; Genorad™ 16, Genorad™ 18 and Genorad™ 20 from Rahn AG; Irgastab™ UV10 and Irgastab™ UV22, Tinuvin™ 460 and CGS20 from Ciba Specialty Chemicals; Floorstab™ UV range (UV-1, UV-2, UV-5 and UV-8) from Kromachem Ltd, Additol™ S range (S100, S110, S120 and S130) from Cytec Surface Specialties.

Since excessive addition of these polymerization inhibitors will lower the ink sensitivity to curing, it is preferred that the amount capable of preventing polymerization is determined prior to blending. The amount of a polymerization inhibitor is preferably lower than 2 wt % based on the total weight of the inkjet ink.

Surfactants

Surfactants are used in inkjet inks to reduce the surface tension of the ink in order to reduce the contact angle on the thermoplastic foil, i.e. to improve the wetting of the foil by the ink. On the other hand, the inkjet ink must meet stringent performance criteria in order to be adequately jettable with high precision, reliability and during an extended period of time. To achieve both wetting of the substrate by the ink and high jetting performance, typically, the surface tension of the ink is reduced by the addition of one or more surfactants. In the case of UV curable inkjet inks, however, the surface tension of the inkjet ink is not only determined by the amount and type of surfactant, but also by the polymerizable compounds, the polymeric dispersants and other additives in the ink composition.

The surfactant(s) can be anionic, cationic, non-ionic, or zwitter-ionic and are usually added in a total quantity less than 20 wt % based on the total weight of the inkjet ink and particularly in a total less than 10 wt % based on the total weight of the inkjet ink.

Suitable surfactants include fluorinated surfactants, fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

Preferred surfactants include fluoro surfactants (such as fluorinated hydrocarbons) and silicone surfactants. The silicones are typically siloxanes and can be alkoxylated, polyether modified, polyester modified, polyether modified hydroxy functional, amine modified, epoxy modified and other modifications or combinations thereof. Preferred siloxanes are polymeric, for example polydimethylsiloxanes.

The fluorinated or silicone compound used as a surfactant may be a cross-linkable surfactant. Suitable copolymerizable compounds having surface-active effects include, for example, polyacrylate copolymers, silicone modified acrylates, silicone modified methacrylates, acrylated siloxanes, polyether modified acrylic modified siloxanes, fluorinated acrylates, and fluorinated methacrylate. These acrylates can be mono-, di-, tri- or higher functional (meth)acrylates.

Depending upon the application a surfactant can be used with a high, low or intermediate dynamic surface tension. Silicone surfactants are generally known to have low dynamic surface tensions while fluorinated surfactants are known to have higher dynamic surface tensions.

Silicone surfactants are often preferred in curable inkjet inks, especially the reactive silicone surfactants, which are able to be polymerized together with the polymerizable compounds during the curing step.

Examples of useful commercial silicone surfactants are those supplied by BYK CHEMIE GMBH (including Byk™-302, 307, 310, 331, 333, 341, 345, 346, 347, 348, UV3500, UV3510 and UV3530), those supplied by TEGO CHEMIE SERVICE (including Tego Rad™ 2100, 2200N, 2250, 2300, 2500, 2600 and 2700), Ebecryl™ 1360 a polysilixone hexaacrylate from CYTEC INDUSTRIES BV and Efka™-3000 series (including Efka™-3232 and Efka™-3883) from EFKA CHEMICALS B.V.

Preparation of Inkjet Inks

The preparation of pigmented UV curable inkjet inks is well-known to the skilled person. Preferred methods of preparation are disclosed in paragraphs [0076] to [0085] of WO 2011/069943 (AGFA).

Inkjet Printing Devices

The inkjet inks may be jetted by one or more print heads ejecting small droplets of ink in a controlled manner through nozzles onto an ink-receiver surface, which is moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However the inkjet printing method according to the present invention is not restricted to piezoelectric inkjet printing. Other inkjet print heads can be used and include various types, such as a continuous type and thermal, electrostatic and acoustic drop on demand type.

The inkjet print head normally scans back and forth in a transversal direction across the moving ink-receiver surface. Often the inkjet print head does not print on the way back. Bi-directional printing is preferred for obtaining a high areal throughput. Another preferred printing method is by a "single pass printing process", which can be performed by using page wide inkjet print heads or multiple staggered inkjet print heads which cover the entire width of the ink-receiver surface. In a single pass printing process the inkjet print heads usually remain stationary and the substrate surface is transported under the inkjet print heads.

UV Curing Devices

The UV curable inkjet inks are cured by exposing them to ultraviolet radiation.

In inkjet printing, the curing means may be arranged in combination with the print head of the inkjet printer, travelling therewith so that the curable composition is exposed to curing radiation very shortly after been jetted.

In such an arrangement it can be difficult to provide a small enough radiation source connected to and travelling with the print head. Therefore, a static fixed radiation source may be employed, e.g. a source of curing UV-light, connected to the radiation source by means of flexible radiation conductive means such as a fiber optic bundle or an internally reflective flexible tube.

Alternatively, the actinic radiation may be supplied from a fixed source to the radiation head by an arrangement of mirrors including a mirror upon the radiation head.

The source of radiation arranged not to move with the print head, may also be an elongated radiation source extending transversely across the ink-receiver surface to be cured and adjacent the transverse path of the print head so that the subsequent rows of images formed by the print head are passed, stepwise or continually, beneath that radiation source.

Any ultraviolet light source, as long as part of the emitted light can be absorbed by the photo-initiator or photo-initiator system, may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:

UV-A: 400 nm to 320 nm
UV-B: 320 nm to 290 nm
UV-C: 290 nm to 100 nm.

Furthermore, it is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed and a high curing degree.

For facilitating curing, the inkjet printer often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

EXAMPLE

Materials

All materials used in the following examples were readily available from standard sources such as Sigma-Aldrich (Belgium) and Acros (Belgium) unless otherwise specified.

PB15:4 is an abbreviation used for a C.I. Pigment Blue 15:4 pigment, available as Hostaperm™ Blue P-BFS from CLARIANT.

DB162 is an abbreviation used for the polymeric dispersant Disperbyk™ 162 available from BYK CHEMIE GMBH whereof the solvent mixture of 2-methoxy-1-methylethylacetate, xylene and n-butylacetate was removed. The polymeric dispersant is a polyester-polyurethane dispersant on the basis of caprolacton and toluene diisocyanate having an amine value of 13 mg KOH/g, a Mn of about 4,425 and a Mw of about 6,270.

E7701 is a polyacrylate dispersant available as Efka™ 7701 from BASF.

VCL is N-vinyl caprolactam available from BASF BELGIUM, NV.

IBOA is isobornylacrylate available as Sartomer™ SR506D from SARTOMER.

EPA is ethoxylated nonylphenol acrylate available as Sartomer™ SR504D from ARKEMA.

PEA is 2-phenoxyethyl acrylate available as Sartomer™ SR339C from ARKEMA.

Oligo B80 is a difunctional co-initiator available as Sartomer™ CN963B80 from ARKEMA.

CN3755 is a diacrylated co-initiator available as Sartomer™ CN3755 from SARTOMER.

DPGDA is dipropyleneglycoldiacrylate available as Laromer™ DPGDA from BASF.

MPDA is 3-methyl-1,6-pentanediyl diacrylate available as Sartomer™ SR341 from ARKEMA.

TMPTA is trimethylolpropane triacrylate available as Sartomer™ SR351 from ARKEMA.

I819 is an abbreviation for Irgacure™ 819, a photoinitiator available from BASF.

DETX is an abbreviation for Genocure™ DETX, a photoinitiator available from RAHN.

ITX is Darocur™ ITX is an isomeric mixture of 2- and 4-isopropylthioxanthone from BASF.

TPO is 2,4,6-Trimethylbenzoyl-diphenyl-phosphineoxide available as Omnirad™ TPO by IGM.

TPO-L is an acylphosphine oxide photoinitiator available as Omnirad™ TPO-L from IGM RESINS.

Benzophenone is available as Omnirad™ BP from IGM RESINS.

EPD is ethyl 4-dimethylaminobenzoate available as Genocuren™ EPD from RAHN AG.

EHA is 2-ethylhexyl 4-dimethylaminobenzoate available as Genocure™ EHA from RAHN.

INHIB is a mixture forming a polymerization inhibitor having a composition according to Table 1.

TABLE 1

| Component | wt % |
| --- | --- |
| DPGDA | 82.4 |
| p-methoxyphenol | 4.0 |
| BHT | 10.0 |
| Cupferron ™ AL | 3.6 |

Cupferron™ AL is aluminum N-nitrosophenylhydroxylamine from WAKO CHEMICALS LTD.

BHT is an abbreviation for 2,6-di-tert.butyl-4-methylphenol (CASRN128-37-0) from ALDRICH CHEMICAL CO.

BYK™ UV3510 is a polyethermodified polydimethylsiloxane wetting agent available from BYK CHEMIE GMBH.

T410 is the surfactant Tegoglide™ 410 from EVONIK.

P2 is an 80 µm thick opaque white polyvinyl chloride foil.

C3 is a 500 µm thick transparent polyvinyl chloride foil coated with a vinylchloride-vinylacetate primer.

Measurement Methods

1. Viscosity

The viscosity of the UV curable compositions was measured at 45° C. and at a shear rate of 1,000 $s^{-1}$ using a Rotovisco™ RV1 viscometer from HAAKE.

2. Surface Tension

The static surface tension of the UV curable inks was measured with a KRÜSS tensiometer K9 from KRÜSS GmbH, Germany at 25° C. after 60 seconds.

2. Adhesion

A cutter is used to cut through the thermoplastic foils and the adhesion of the different layers to each other is evaluated.

TABLE 2

| Criterium | Evaluation |
| --- | --- |
| OK | No or only slight delamination |
| Not OK | Strong delamination |

3. Cracking

During heat-pressing an embossing plate have was brought into contact with the protective layer for proving a wood grain relief on a decorative panel. After heat-pressing the decorative panel was evaluated for visually observable cracks in the ink image layer.

TABLE 3

| Criterium | Evaluation |
| --- | --- |
| OK | No cracks visible |
| Not OK | Cracks visible |

4. Average Particle Size

The particle size of pigment particles in a pigment dispersion was determined by photon correlation spectroscopy at a wavelength of 633 nm with a 4 mW HeNe laser on a diluted sample of the pigment dispersion. The particle size analyzer used was a Malvern™ nano-S available from Goffin-Meyvis.

The sample was prepared by addition of one drop of pigment dispersion to a cuvette containing 1.5 mL ethyl acetate and mixed until a homogenous sample was obtained. The measured particle size is the average value of 3 consecutive measurements consisting of 6 runs of 20 seconds.

Example 1

This example illustrates the effect of the polymerizable compounds on the adhesion and cracking in heat-pressing of a decorative panel using polyvinyl chloride foils.

Preparation of Inkjet Inks

Two inks Ink-A and Ink-B were formulated which were then used to prepare mixtures containing different amounts of monofunctional and polyfunctional polymerizable compounds.

Cyan Pigment Dispersion

Cyan pigment dispersions were made by mixing the components according to Table 4 for 30 minutes using a DISPERLUX™ disperser from DISPERLUX S.A.R.L., Luxembourg. The dispersions were then milled using a Bachofen DYNOMILL ECM mill filled with 0.4 mm yttrium stabilized zirconia beads ("high wear resistant zirconia grinding media" from TOSOH Co.). The mixtures were circulated over the mill for 2 hours. After milling, the pigment dispersions were discharged over a 1 µm filter into a vessel.

TABLE 4

| Component | wt % |
| --- | --- |
| PB15:4 | 16.00 |
| Dispersant | 16.00 |
| INHIB | 1.00 |
| Monomer | 67.00 |

A first cyan pigment dispersion was made using DB162 as dispersant and the polyfunctional polymerizable compound DPGDA as monomer and had an average particle size of 119 nm. This cyan pigment dispersion was used to prepare Ink-A.

A second cyan pigment was made using EFKA7701 as dispersant and the polyfunctional polymerizable compound PEA as monomer and had an average particle size of 133 nm. This cyan pigment dispersion was used to prepare Ink-B.

Preparation of Ink-A

The inkjet ink Ink-A was prepared using the above prepared first cyan pigment dispersion and combining it with the other components according to Table 5. The wt % is based on the total weight of the inkjet ink.

TABLE 5

| wt % of component | Ink-A |
| --- | --- |
| PB15:4 | 3.0 |
| DB162 | 3.0 |
| DPGDA | 36.4 |
| MPDA | 24.5 |
| TMPTA | 14.0 |
| TPO-L | 5.0 |
| I819 | 4.0 |
| DETX | 4.0 |
| EPD | 5.0 |
| INHIB | 1.0 |
| BYK ™ UV3510 | 0.1 |

The viscosity and surface tension of Ink-A were measured and found to be 10 mPa·s respectively 24 mN/m. Ink-A includes a polymerizable composition consisting for 100 wt % out of polyfunctional polymerizable compounds, wherein the weight percentage wt % is based on the total weight of the polymerizable composition.

Preparation of Ink-B

The inkjet ink Ink-B was prepared using the above prepared first cyan pigment dispersion and combining it with the other components according to Table 6. The wt % is based on the total weight of the inkjet ink.

TABLE 6

| wt % of component | Ink-B |
| --- | --- |
| PB15:4 | 2.5 |
| E7701 | 2.5 |
| IBOA | 33.3 |
| VCL | 16.6 |
| EPA | 9.1 |
| PEA | 14.4 |
| Oligo B80 | 3.0 |
| ITX | 2.0 |
| TPO | 3.0 |
| I819 | 2.3 |
| EHA | 3.0 |
| Benzophenone | 4.0 |
| CN3755 | 3.0 |

TABLE 6-continued

| wt % of component | Ink-B |
| --- | --- |
| INHIB | 1.0 |
| T410 | 0.3 |

The viscosity and surface tension of Ink-B were measured and found to be 11 mPa·s respectively 23 mN/m. Ink-B includes a polymerizable composition consisting of 91 wt % of monofunctional polymerizable compounds and 9 wt % of polyfunctional polymerizable compounds, wherein the weight percentage wt % is based on the total weight of the polymerizable composition.

Preparation of Ink Mixtures

The inkjet inks Ink-A and Ink-B were used to make the ink mixtures MIX-1 to MIX-11 according to Table 7.

TABLE 7

| Ink mixtures | wt % based on the ink mixture | | wt % based on the polymerizable composition | |
| --- | --- | --- | --- | --- |
| | Ink-A | Ink-B | Monofunctional | Polyfunctional |
| MIX-1 | 100 | 0 | 0 | 100 |
| MIX-2 | 90 | 10 | 9 | 91 |
| MIX-3 | 80 | 20 | 18 | 82 |
| MIX-4 | 70 | 30 | 27 | 73 |
| MIX-5 | 60 | 40 | 36 | 64 |
| MIX-6 | 50 | 50 | 46 | 55 |
| MIX-7 | 40 | 60 | 55 | 45 |
| MIX-8 | 30 | 70 | 64 | 36 |
| MIX-9 | 20 | 80 | 73 | 27 |
| MIX-10 | 10 | 90 | 82 | 18 |
| MIX-11 | 0 | 100 | 91 | 9 |

The ink mixtures MIX-1 to MIX-11 were coated on the matt side of the thermoplastic foil P2 using a bar coater and a 10 μm wired bar. The coated sample was mounted on a belt, transporting the sample under a Phoseon™ Fire Line 125 LED curing device with an output wavelength of 395 nm, at a speed of 20 m/min using 12 W output at a distance of 4.5 mm from the LED.

Manufacturing of Decorative Panel

The coated thermoplastic foils P2 were each combined with a transparent thermoplastic foil C3, by having the ink mixture layer on the foil P2 facing the primer layer of the foil C3. Together with 4 mm thick PVC foil containing glass fibres as a base layer the foils P2 and C3 were heat pressed for 1 minute using an embossing plate at a temperature of 200° C. and a pressure of 12 bar and then cut into a decorative panel.

Evaluation and Results

The heat-pressed samples were evaluated for adhesion and cracking.

TABLE 8

| Sample | wt % Monofunctional | wt % Polyfunctional | Cracking | Adhesion |
| --- | --- | --- | --- | --- |
| MIX-1 | 0 | 100 | Not OK | OK |
| MIX-2 | 9 | 91 | Not OK | OK |
| MIX-3 | 18 | 82 | Not OK | OK |
| MIX-4 | 27 | 73 | Not OK | OK |
| MIX-5 | 36 | 64 | OK | OK |
| MIX-6 | 46 | 55 | OK | OK |
| MIX-7 | 55 | 45 | OK | OK |
| MIX-8 | 64 | 36 | OK | OK |
| MIX-9 | 73 | 27 | OK | Not OK |

TABLE 8-continued

| Sample | wt % Monofunctional | wt % Polyfunctional | Cracking | Adhesion |
|---|---|---|---|---|
| MIX-10 | 82 | 18 | OK | Not OK |
| MIX-11 | 91 | 9 | OK | Not OK |

From Table 8, it can be seen that only the ink mixtures MIX-5 to MIX-8 having a polymerizable composition in accordance with the invention were capable of delivering decorative panels having no cracks and good adhesion.

REFERENCE SIGNS LIST

TABLE 9

| 11 | PVC roll manufacturer |
| 12 | PVC roll |
| 13 | Decor printer |
| 14 | Gravure printing |
| 15 | Decorative PVC roll |
| 16 | Warehouse PVC rolls |
| 17 | Warehouse decorative PVC rolls |
| 18 | Floor panel manufacturer |
| 19 | Inkjet printing |
| 20 | Heat pressing |
| 21 | Base layer |
| 22 | Decorative panel |
| 23 | Decorative panel set |
| 31 | Tongue |
| 32 | Groove |
| 33 | Protective layer |
| 34 | Decorative layer |
| 35 | Base layer |

The invention claimed is:

1. A method for manufacturing a decorative surface, the method comprising, in order, the steps of:
    inkjet printing and UV curing an image on a first thermoplastic foil using a pigmented UV curable inkjet ink to form an inkjet printed image;
    applying a second thermoplastic foil on the inkjet printed image; and
    heat pressing the first and second thermoplastic foils into a decorative laminate; wherein
    the pigmented UV curable inkjet ink includes a polymerizable composition including 30 to 70 wt % of monofunctional polymerizable compounds and 30 to 70 wt % of polyfunctional polymerizable compounds, the weight percentage wt % based on a total weight of the polymerizable composition;
    the pigmented UV curable inkjet ink includes a pigment in an amount from 0.1 to 20 wt % based on a total weight of the pigmented UV curable inkjet ink; and
    at least one of the first and second thermoplastic foils is a transparent foil.

2. The method according to claim 1, further comprising the step of:
    cutting the decorative laminate into a decorative panel.

3. The method according to claim 1, wherein the first and second thermoplastic foils include polyvinyl chloride.

4. The method according to claim 1, wherein the pigmented UV curable inkjet ink is printed on the transparent foil.

5. The method according to claim 1, wherein one of the first and second thermoplastic foils is an opaque foil, and the pigmented UV curable inkjet ink is printed on the opaque foil.

6. The method according to claim 1, wherein the first and second thermoplastic foils include an opaque foil and the transparent foil.

7. The method according to claim 1, wherein the decorative panel includes a base layer.

8. The method according to claim 7, wherein the base layer substantially includes polyvinyl chloride and reinforcing fibers.

9. The method according to claim 8, wherein the reinforcing fibers include glass fibers.

10. The method according to claim 1, wherein the monofunctional and polyfunctional polymerizable compounds include more than 80 wt % of acrylates based on the total weight of the polymerizable composition.

11. The method according to claim 1, wherein the step of heat pressing includes preheating the first and second thermoplastic foils to a temperature above 130° C.; and
    using a cooled press to fuse the first and second thermoplastic foils into the decorative laminate.

12. A decorative panel obtained by the method according to claim 1.

13. The decorative panel according to claim 12, wherein the decorative panel includes a glueless tongue and groove joint capable of interlocking other decorative panels.

14. The decorative panel according to claim 12, wherein the decorative panel has a thickness of 2 mm to 6 mm.

15. The decorative panel according to claim 12, wherein the decorative panel includes a base layer, a decorative layer, a protective layer, and a polyurethane finishing layer on the protective layer.

* * * * *